United States Patent
Demaj et al.

(10) Patent No.: US 9,629,157 B2
(45) Date of Patent: Apr. 18, 2017

(54) PLL FREQUENCY SELECTION

(71) Applicant: Optis Circuit Technology, LLC, Plano, TX (US)

(72) Inventors: Pierre Demaj, Nice (FR); Fabrizio Tomatis, Saint Laurent du Var (FR)

(73) Assignee: OPTIS CIRCUIT TECHNOLOGY, LLC, Plano, TX (US)

( * ) Notice: Subject to any disclaimer, the term of this patent is extended or adjusted under 35 U.S.C. 154(b) by 0 days.

(21) Appl. No.: 14/375,166

(22) PCT Filed: Feb. 11, 2013

(86) PCT No.: PCT/EP2013/052693
§ 371 (c)(1),
(2) Date: Jul. 29, 2014

(87) PCT Pub. No.: WO2013/124179
PCT Pub. Date: Aug. 29, 2013

(65) Prior Publication Data
US 2015/0004989 A1    Jan. 1, 2015

Related U.S. Application Data

(60) Provisional application No. 61/611,801, filed on Mar. 16, 2012.

(30) Foreign Application Priority Data

Feb. 21, 2012 (EP) ................................ 12305199

(51) Int. Cl.
*H04L 5/00*    (2006.01)
*H04W 72/04*    (2009.01)
*H04B 1/10*    (2006.01)

(52) U.S. Cl.
CPC ...... *H04W 72/0453* (2013.01); *H04B 1/1027* (2013.01); *H04L 5/0037* (2013.01)

(58) Field of Classification Search
CPC . H04W 52/52; H04W 28/0236; H04W 56/00; H04W 56/0035; H04W 52/24;
(Continued)

(56) References Cited

U.S. PATENT DOCUMENTS 7,495,607 B1 *    2/2009    Zhodzishsky ........... G01S 19/37
                                                   342/357.31
2004/0202271 A1 *  10/2004    Fahim ................. H03D 13/004
                                                         375/376
(Continued)

FOREIGN PATENT DOCUMENTS

| JP | 2006-148383 A | 6/2006 |
| JP | 2010-050780 A | 3/2010 |
| WO | 2008/072171 A1 | 6/2008 |

OTHER PUBLICATIONS

3GPP TS 25.331 V8.9.0 (Dec. 2009).*
(Continued)

*Primary Examiner* — Qun Shen
(74) *Attorney, Agent, or Firm* — The Danamraj Law Group, P.C.; Thomas L. Crisman; Kenneth A. McClure

(57) ABSTRACT

A method of controlling a frequency selection of a PLL used in cooperation with a device of a wireless communication network, such as a Universal Mobile Telecommunication System (UMTS) network, the method comprising: —receiving a first set of signal measurements; —comparing the first set of signal measurements with a first threshold and, selectively switching the PLL frequency from a first value to a second value as a result of the comparison of the first set of signal measurements with the first threshold; —further receiving a second set of signal measurements; and, —comparing the second set of signal measurements with a second
(Continued)

threshold, different from the first threshold, and selectively switching the PLL frequency from the second value to the first value as a result of the comparison of the second set of signal measurements with the second threshold.

16 Claims, 4 Drawing Sheets

(58) Field of Classification Search
CPC ............. H04W 52/241; H04W 52/245; H04W 72/0453; H03L 2207/50; H03L 7/099; H03L 7/091; H03L 7/0991; H03L 7/18; H03L 7/093; H04B 1/1027; H04L 5/0037
USPC ............. 375/376; 331/1 A, 16, 17; 327/156; 455/450
See application file for complete search history.

(56) References Cited

U.S. PATENT DOCUMENTS

| | | | |
|---|---|---|---|
| 2006/0209979 A1* | 9/2006 | Sandell et al. | ............... 375/267 |
| 2006/0258313 A1* | 11/2006 | Uozumi | ............... H03L 1/02 455/252.1 |
| 2007/0153880 A1* | 7/2007 | Cartmell | ............... H03J 7/04 375/149 |
| 2009/0011733 A1* | 1/2009 | Akiya | ............... H03J 1/0083 455/165.1 |
| 2009/0111409 A1* | 4/2009 | Sun et al. | ............... 455/208 |
| 2009/0149202 A1* | 6/2009 | Hill | ............... G01S 5/18 455/456.6 |
| 2010/0273442 A1 | 10/2010 | Zeng et al. | |

OTHER PUBLICATIONS

International Search Report issued in corresponding International application No. PCT/EP2013/052693, date of mailing Mar. 21, 2013.

Written Opinion of the International Searching Authority issued in corresponding International application No. PCT/EP2013/052693, date of mailing Mar. 21, 2013.

Extended European Search Report issued in corresponding European application No. EP 12 30 5199, date of completion Sep. 11, 2012.

* cited by examiner

PLL FREQUENCY SELECTION

FIELD OF THE INVENTION

This invention relates to phase locked loops (PLL) in wireless communication networks and, more particularly, to a method and a device for controlling PLL frequency selection allowing reduction of spurious frequencies in a serving cell of such a network.

BACKGROUND OF THE INVENTION

The PLL technique has been around for a long time and has a wide variety of applications in wireless communication networks. It is frequently used for implementing operations such as demodulation, decoding, synchronisation, frequency synthesis or sampling.

In a frequency synthesiser, for instance, the PLL technique may be used for generating one or many accurate signal oscillation frequencies from one or more reference sources. In e.g. a radiofrequency (RF) receiver, a PLL may be associated with a signal mixer. A signal mixer is a circuit capable of translating a signal from a given frequency within the RF band to another, lower frequency known as an intermediate frequency (IF), by combining the RF signal with a signal oscillating at a given frequency generated by the PLL. However, apart from the RF signal, other oscillation frequencies generated by the operation of the PLL may reach the input of the mixer. These unwanted signals, known as spurs, may also be translated within the IF frequency band, thus resulting in a degradation of the receiver's performance in terms of signal-to-noise ratio (SNR).

In other part of a receiver, PLL technique may further be used for producing an accurate sampling frequency that can be used as an input for an analog-to-digital converter (ADC). An ADC is a circuit that converts an analog signal at a given frequency into a digital signal. However, apart from the frequency of the analog signal, other frequencies generated by the PLL may reach the analog input of the ADC. These unwanted signals, also known as spurs in that context, may affect the accuracy of the digital output signal resulting in a degradation of the ADC and hence of the receiver's performance.

In order to address these problems, some solutions may be considered to switch the default PLL frequency to another, more appropriate frequency. The intended effect is to reject the spurs out of the frequency bandwidth of the analog signal of interest. This technique, known as frequency evasion, however presents some drawbacks because wrong PLL frequency change decisions can be made which may result in a waste of time for re-synchronizing the PLL. In addition, a "ping-pong" effect, whereby the PLL frequency change is done too often, can be experienced. All of this leads to a degradation of the receiver performance. Therefore, it is desirable to improve the control scheme of the PLL frequency for e.g. preventing the degradation of the performances of a receiver of a wireless communication network, while avoiding or at least reducing the above negative effects.

SUMMARY OF THE INVENTION

These problems may be overcome by collecting sets of signal measurements that are compared to signal thresholds.

Indeed, a first aspect proposes a method of controlling a frequency selection of a PLL used in cooperation with a device of a wireless communication network, such as a Universal Mobile Telecommunication System (UMTS) network, the method comprising the steps of receiving a first set of signal measurements performed at an operation frequency of the device during a sliding window; comparing the first set of signal measurements with a first threshold and, selectively switching the PLL frequency from a first value to a second value as a result of the comparison of the first set of signal measurements with the first threshold; after the PLL frequency has changed from the first value to the second value, resetting the sliding window and also receiving a second set of signal measurements performed at the operation frequency of the device during the sliding window; and, comparing the second set of signal measurements with a second threshold, different from the first threshold and selectively switching the PLL frequency from the second value to the first value as a result of the comparison of the second set of signal measurements with the second threshold.

A second aspect relates to a receiver comprising a mechanism for controlling a frequency selection of a PLL used in cooperation with a device of a wireless communication network, such as a Universal Mobile Telecommunication System (UMTS) network, the receiver comprising a unit configured for receiving a first set of signal measurements performed at an operation frequency of the device during a sliding window;

a unit configured for comparing the first set of signal measurements with a first threshold and, selectively switching the PLL frequency from a first value to a second value as a result of the comparison of the first set of signal measurements with the first threshold; after the PLL frequency has changed from the first value to the second value, a unit configured for resetting the sliding window and also configured for receiving a second set of signal measurements performed at the operation frequency of the device during the sliding window; and a unit configured for comparing the second set of signal measurements with a second threshold, different from the first threshold and selectively switching the PLL frequency from the second value to the first value as a result of the comparison of the second set of signal measurements with the second threshold.

Another aspect relates to a wireless device such as a smartphone, a tablet or a computer comprising the receiver of the second aspect.

Thus, in a receiver embodying the principles of such a frequency evasion scheme, a PLL frequency change decision is triggered based on a plurality of signal measurements using two different signal thresholds for alternatively changing the PLL frequency from one given value to at least one different value, thus with an hysteresis effect. Such control scheme for changing the PLL frequency has the advantage of avoiding wrong PLL frequency decisions of changing, and "ping-pong" effect.

In one embodiment, when all signal measurements of the first set of signal measurements are beyond the first threshold, the PLL frequency change from the first value to the second value is triggered by an event based on the prior comparison. The PLL frequency is set by default to the first value. The second value of the PLL frequency may be chosen from a list of given frequencies. This allows easier implementation using, for instance, a set of discrete control values respectively associated with each of the frequencies, which may be stored in a data register.

The first threshold may be a signal level below which numerous spurs would ultimately lead to unacceptable degradation of performances of the receiver. This has the advantage of guaranting that the PLL frequency change is made only when the receiver is operated in a range of operation that is the most sensitive to spurs. The likelihood of wrong PLL frequency change can thus be reduced.

In another embodiment, when at least one third of a second set of signal measurements are beyond the second threshold, the PLL frequency changes from the second value to the first value is triggered by an event based on the prior comparison. The second threshold may be a signal level above which numerous spurs would have negligible impact on the receiver performances. This helps guarantying that the PLL frequency change is made only when the receiver is operated in a range of operation that is considered the least sensitive to spurs. The frequent "ping-pong" switch from one PLL frequency to another PLL frequency can thus be limited.

In accordance with a feature of the proposed solution, the set of signal measurements is fixed to correspond to an integer N of signal measurements, greater than 1, collected over the sliding window. This helps guarantying that variability of the signal over a sufficient period is considered before triggering the PLL frequency change.

BRIEF DESCRIPTION OF THE DRAWINGS

A more complete understanding of the proposed solution may be obtained from an exemplary consideration of the following description in conjunction with the drawings, in which.

DETAILED DESCRIPTION

Figure 1A:
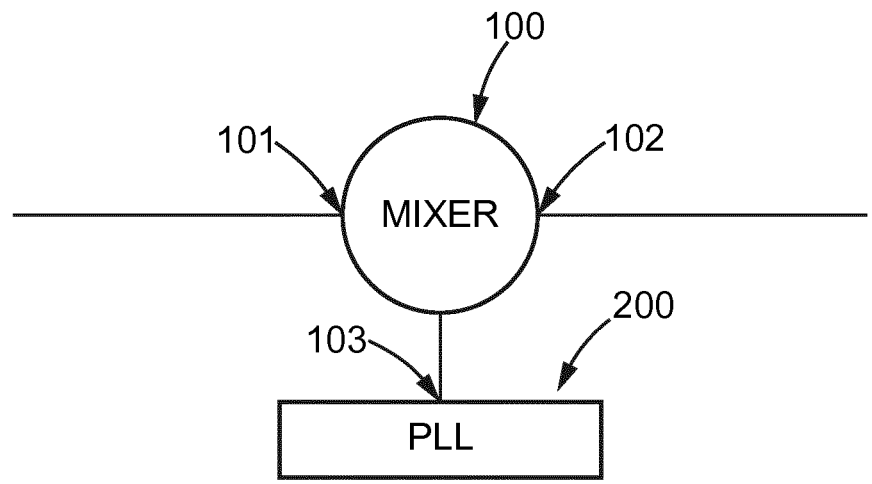
FIGS. 1a and 1b are block diagrams illustrating conventional art usages of the PLL technique.

In the drawings, like reference numbers designate like parts in various Figures. Expressions such as "comprise", "include", "incorporate", "contain", "is" and "have" are to be construed in a non-exclusive manner when interpreting the description and its associated claims, namely construed to allow for other items or components that are not explicitly defined also to be present. Reference to the singular is also to be construed in being a reference to the plural, and vice versa.

FIG. 1a is a block diagram illustrating a conventional art usage of the PLL technique associated with a mixer 100. In this example, a PLL 200 is configured for generating one or many accurate signal oscillation frequencies at the output 103 of the PLL from one or more reference sources that would be combined with the input 101 of the mixer 100. This would generate a mixed output signal at the output 102 of the mixer 100. In this example, the oscillation frequencies generated by operation of the PLL 200 at the output 103 of the PLL may reach the input 101 of the mixer 100. This implementation may correspond to an operation of RF down conversion used for an operation of demodulation of a RF signal where the PLL 100 is used to specify the rate of the sampling of the RF signal.

Figure 1B:
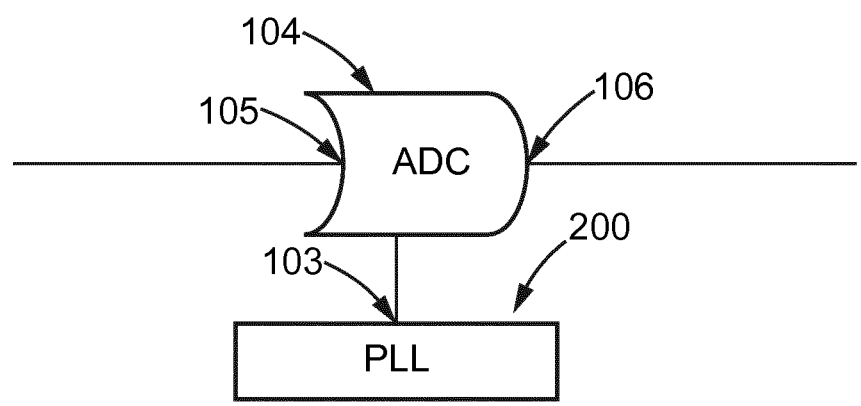

FIG. 1b is a block diagram illustrating a conventional art usage of the PLL technique associated with an ADC 104. In this example, a PLL 200 is configured for generating one or many accurate signal oscillation frequencies at the output 103 of the PLL from one or more reference sources that would be combined with the input 105 of the ADC 104. This would generate a discrete time digital signal at the output 106 of the ADC 106. In this example, the oscillation frequencies generated by operation of the PLL 200 at the output 103 of the PLL may reach the input 105 of the ADC 104. This implementation corresponds to an operation of analog-to-digital conversion of a RF signal, where the PLL 100 specifies the rate of the sampling of the RF signal.

In the rest of the description, we will consider the proposed solution being embodied in a wireless receiver of a wireless communication network such as a Universal Mobile telecommunication System (UMTS) network. This receiver is being located in a serving cell of such network and uses a mixer for down converting and processing RF signals received from the serving cell. However, the following given examples should be understood as being solely an illustration and no way limit the scope of the proposed solution.

Figure 2:
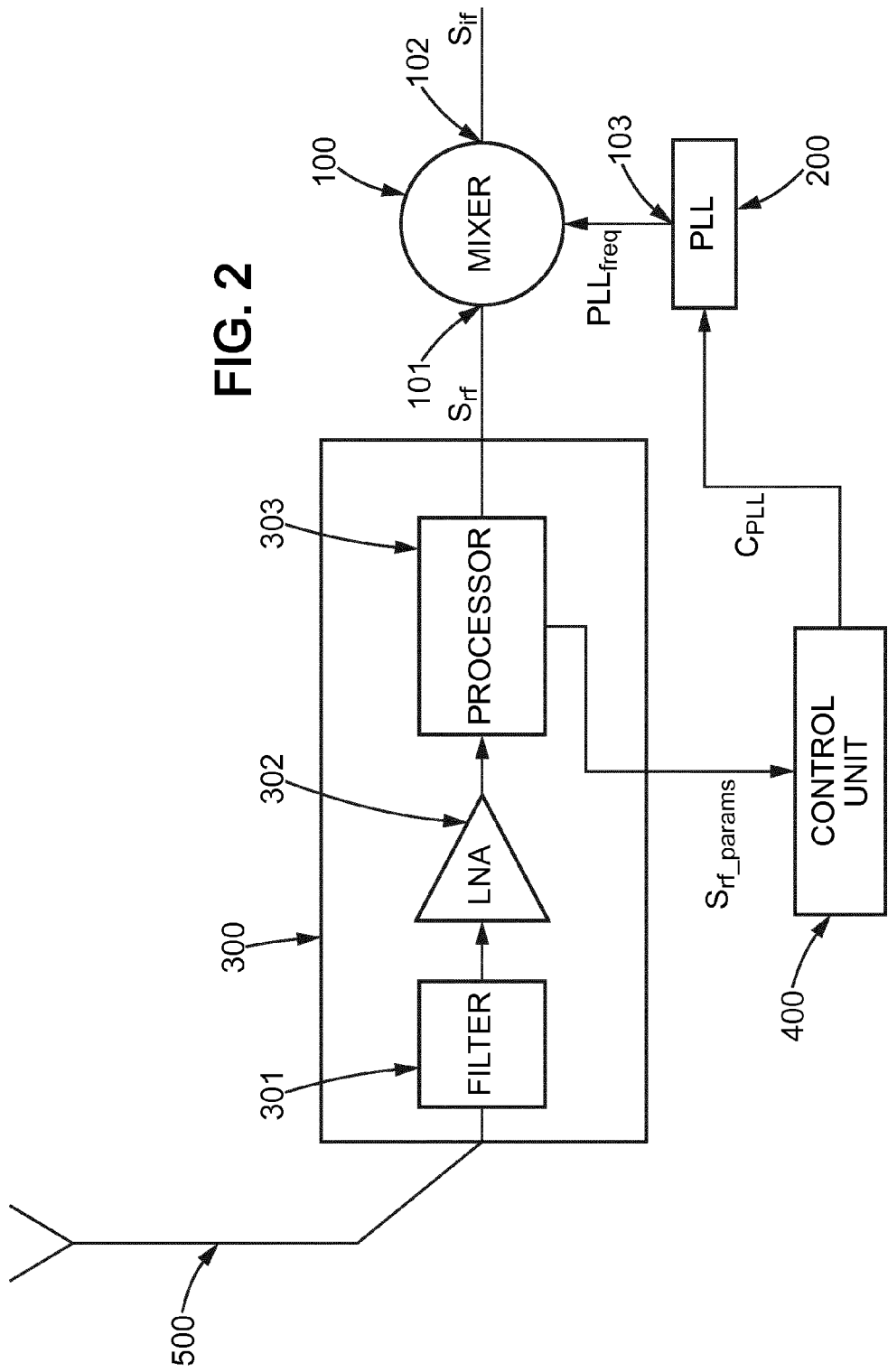
FIGS. 2 and 3 are block diagrams illustrating an embodiment of the device.

FIG. 2 is a block diagram illustrating a configuration of a wireless receiver according to an embodiment of the proposed solution. It comprises a control unit 400, a mixer 100, a PLL 200 and a RF unit 300. The RF unit 300 consists of a filter 301, a low noise amplifier 302 and RF signal processor 303. In this configuration, the RF signals received on the antenna 500 from the serving cell are first filtered by the filter 301 in order to keep only the RF signals within the channel that is considered. Then, the LNA 302 amplifies the filtered RF signals, since received RF signals are usually weak due to propagation in the air. Finally, a processor 303 performs some operations on the resulting RF signals such as the calculation of RF signal measurements parameters. In the case of a UMTS network, such parameters may be the received signal code power (RSCP) measurement parameter or the chip energy to total power (Ec/Io) measurement parameter. The processor 303 connects to both the control unit 400 and the mixer 100. When the processor 303 connects to the mixer 100, it sends the RF signals $S_{rf}$ that have been filtered and amplified in the RF unit 300. The RF signals $S_{rf}$ are then combined in the mixer 100 with the oscillation frequency $PLL_{freq}$ generated by the PLL. This combination results in an intermediate IF signal $S_{if}$ that is further used in other parts of the wireless receiver.

When the processor 303 connects to the control unit 400, it sends RF signal measurements parameters $S_{rf\_params}$ such as RSCP or Ec/Io measurement parameters to the control unit 400. These measurements parameters are usually compulsory in many wireless communication networks and mainly serve for assessing the quality and the strength of received RF signals. For instance, in wireless local area networks (WLAN) the received signal strength indication (RSSI) is equivalent to RSCP and the signal to noise ratio (SNR) is equivalent to Ec/Io. The control unit 400 may thus send a command $C_{PLL}$ to the PLL 200 to order the frequency change of the PLL 200 based on the signal measurement parameters $S_{rf\_params}$ in order to avoid spurs being received at the input 101 of the mixer 100.

Figure 3:
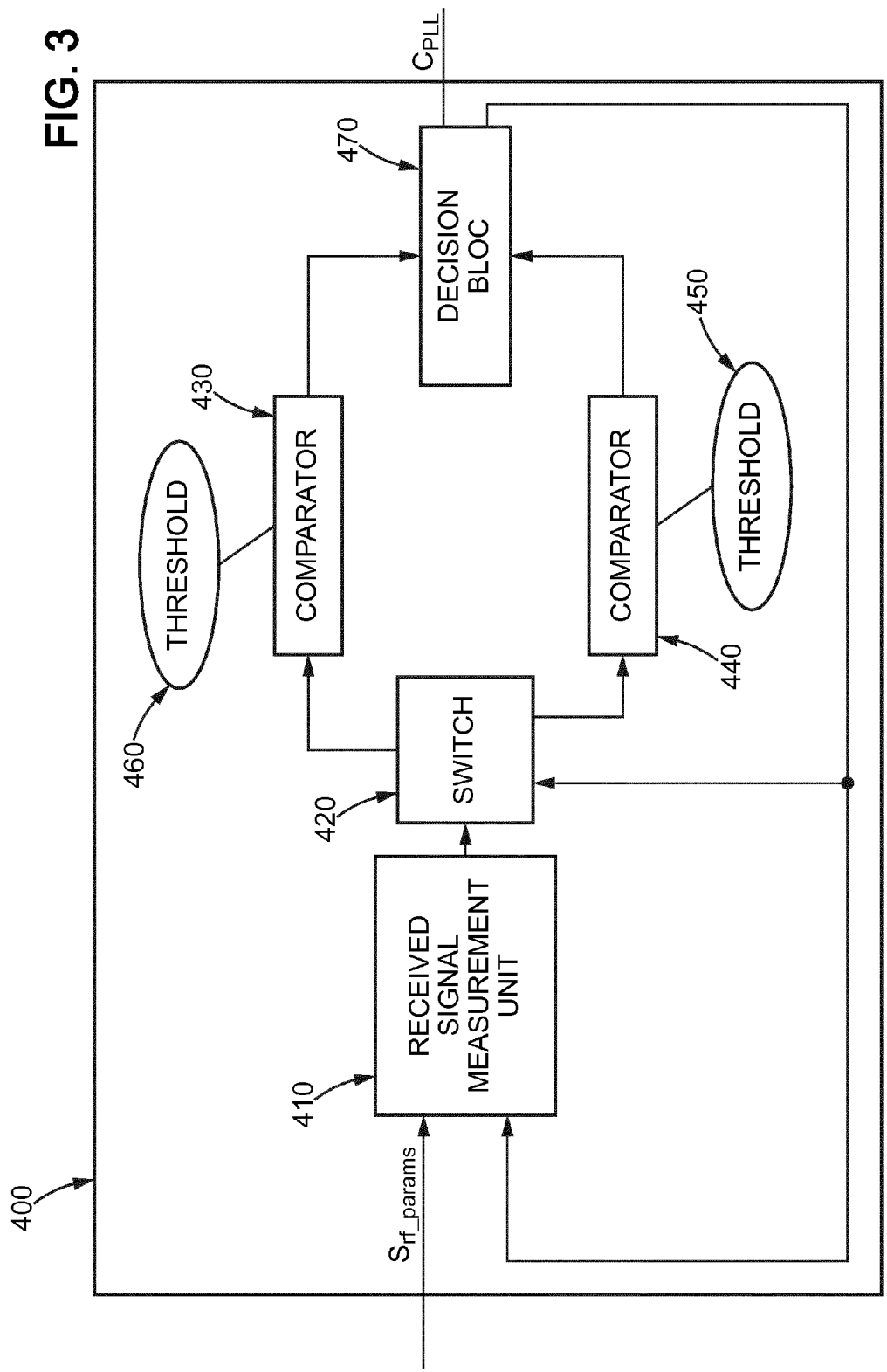

The generation of the command $C_{PLL}$ shall now be described with reference to FIG. 3 that shows an example of implementation of the control unit 400. The control unit 400 comprises a received signal measurement unit 410, a switch 420, comparators 430,440, a decision bloc 470 associated with RF signal measurement thresholds 450,460. The thresholds 450,460 may, for instance, be parameters stored in any suitable data registers of the device.

In this embodiment, the signal measurement parameters $S_{rf\_params}$ are received at the signal measurement unit 410 during a given sliding window. The signal measurement parameters $S_{rf\_params}$ that are collected may preferably be non-contiguous. As use herein, the term "non-contiguous"

refers to signal measurement parameters $S_{rf\_params}$ obtained at more than one moment in time where these moments in time are separated by amount of time that is at least two times greater the delay spread of the propagation channel. The non-contiguous requirement helps guarantying that the variability of the RF signal is considered and taken into account (i.e. the fact that RF signal received on the antenna 500 from the serving cell fluctuates over time). Therefore, taking only contiguous signal measurement parameters $S_{rf\_params}$ could be misleading in evaluating the real nature of quality and/or strength of the RF signals, thus leading to a wrong PLL frequency change decision characterised by the command $C_{PLL}$ is. As a result, non-contiguous signal measurement parameters $S_{rf\_params}$ are a good way of estimating the RF signal behaviour over a sufficient period.

The set of signal measurement parameters $S_{rf\_params}$ that have been collected are thus sent to a switch 420 that decides which comparator 430,440 may be used for comparison to the associated threshold 450,460. Each comparator 450,460 may have different criteria while comparing the set of signal measurement parameters $S_{rf\_params}$ to the associated threshold 450, 460. Each threshold 450,460 may be a signal quality threshold such as Ec/Io thresholds or SNR thresholds and may be a signal strength threshold such RSCP thresholds or RSSI thresholds. The behaviour of the switch 420 is controlled by the decision bloc 470.

By default, the decision bloc 470 order the switch 420 to select the comparator 450,460 associated to the less stringent threshold 450,460. The less stringent threshold being the one that makes it less difficult to change the PLL frequency based on the of signal measurement parameters $S_{rf\_params}$. Another ability of the decision bloc 470 is to request another set of signal measurement parameters $S_{rf\_params}$ to the received signal measurement unit 410 when the result of the comparators 430,440 associated with the thresholds 450,460 are not successful. This means that no PLL frequency change is required on the PLL 200. Another ability of the decision bloc is to send a command $C_{PLL}$ to the PLL 200 to order the frequency change of the PLL 200 based on the result of the comparators 430,440 associated with the thresholds 450,460. Hereafter is described the generation of the $C_{PLL}$ command. We will consider as an example that threshold 450 is the first threshold and threshold 460 is the second threshold. However, it is important to remember that it could the converse without departing from the scope of the proposed solution.

When the PLL 200 is operating at a frequency set to the first value and when all the set of a first RF signal measurement parameters $S_{rf\_params}$ are beyond the first threshold 450, the decision bloc 470 sends a command $C_{PLL}$ that order the PLL 200 to switch the PLL frequency from a first value to a second value. If the preposition "beyond" from the previous statement is understood as the preposition "below" then the first given signal threshold would preferably be a signal level below which numerous spurs would ultimately lead to unacceptable receiver degradation. On the other end, if the preposition "beyond" from the previous statement is understood as meaning the same as the preposition "above" then the first given signal threshold would preferably be a signal level above which numerous spurs would ultimately lead to unacceptable receiver degradation. In some variants, one may interpret the preposition "beyond" as corresponding to the preposition "below", depending on the definition of the measurements that is considered. In both case, this helps guarantying that the PLL frequency change is made only when the receiver is considered the most sensitive to spurs. The likelihood of wrong PLL frequency change can thus be reduced.

When the PLL 200 is operating at a frequency set to the first value and when not all the set of a first RF signal measurement parameters $S_{rf\_params}$ are beyond a first given threshold 450, the decision bloc 470 sends a command to the received signal measurement unit 410 ordering the reception of a new set of RF signal measurement parameters $S_{rf\_params}$.

When the PLL 200 is operating at a frequency set to the second value and when at least one third of the set of a second RF signal measurement parameters $S_{rf\_params}$ are beyond a second given threshold 460, the decision bloc 470 sends a command $C_{PLL}$ that order the PLL 200 to switch the PLL frequency from the second value to the first value. If the preposition "beyond" from the previous statement is understood as the preposition "above" then the second given signal threshold would preferably be a signal level above which numerous spurs would have negligible impact on the receiver degradation. On the other end, if the preposition "beyond" from the previous statement is understood as the preposition "below" then the second given signal threshold would preferably be a signal level below which numerous spurs would have negligible impact on the receiver degradation. An embodiment would consider the preposition "beyond" being considered as the preposition "above". In both case, this helps guarantying that the PLL frequency change is made only when the receiver is considered the least sensitive to spurs. The frequent "ping-pong" switch to another PLL frequency change can thus be limited.

When the PLL 200 is operating at a frequency set to the second value and when not all the first RF signal measurement parameters $S_{rf\_params}$ are beyond the second given threshold 460, the decision bloc 470 sends a command to the received signal measurement unit 410 ordering the reception of a new set of RF signal measurement parameters $S_{rf\_params}$.

Figure 4:
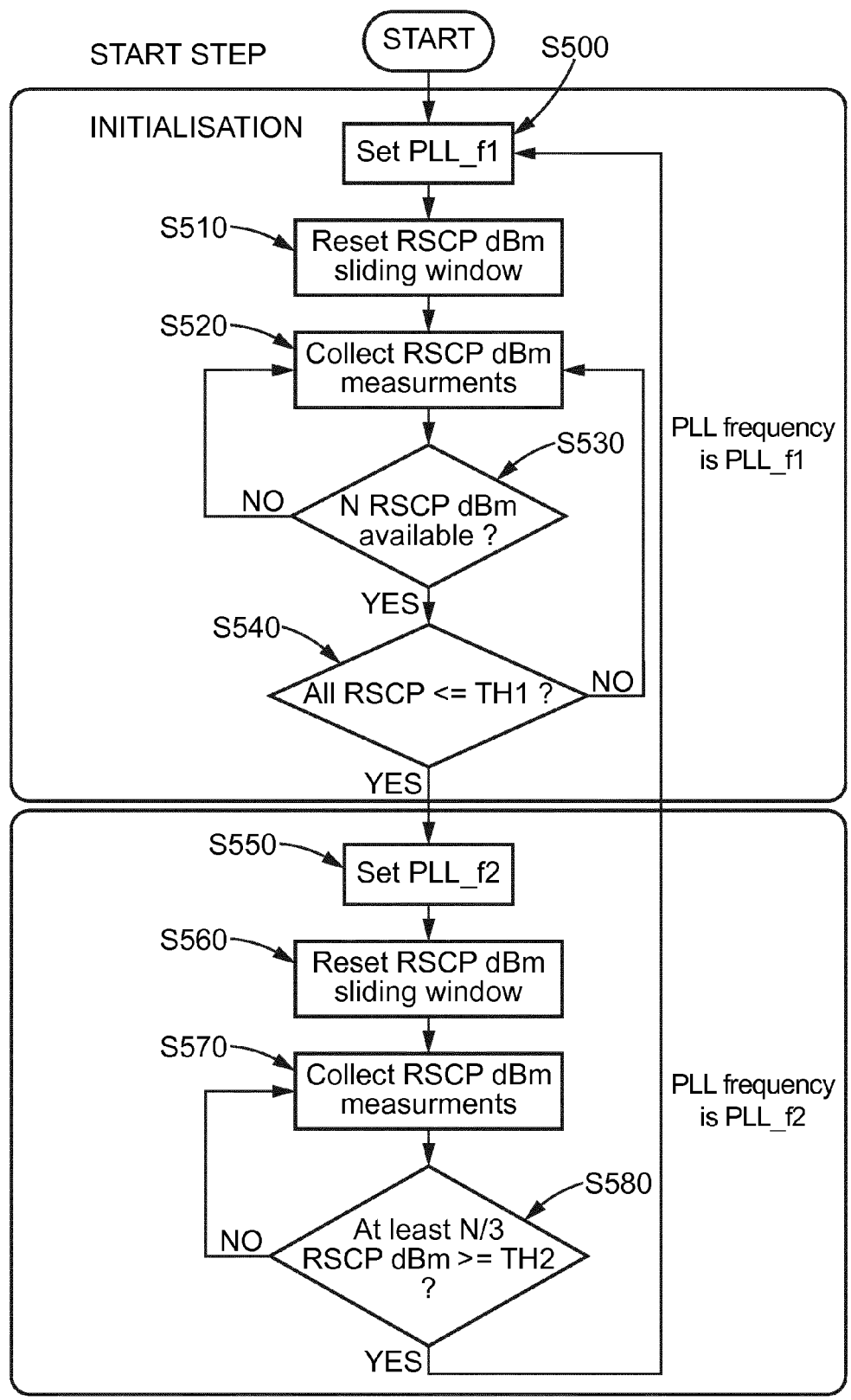
FIG. 4 is a flow diagram illustrating embodiments of the method.

Referring to FIG. 4, in step S500, the default PLL frequency is set to PLL_f1. In step S510, the sliding window is reset such that it contains no signal measurement parameters $S_{rf\_params}$ such as RSCP measurement parameters. The sliding window, after being reset is further used in step S520 to collect signal measurement parameters $S_{rf\_params}$ such as RSCP measurement parameters. In step S530, a test is performed to verify whether at least N signal measurement parameters $S_{rf\_params}$ such as RSCP measurement parameters have been gathered in the sliding window.

If it is not the case, the collection of signal measurement parameters $S_{rf\_params}$ such as RSCP measurement parameters in step S520 will continue. On the contrary, if at least N signal measurement parameters $S_{rf\_params}$ such as RSCP measurement parameters have been gathered in the sliding window during step S520 then the algorithm proceeds to step S540. In step S540, all signal measurement parameters $S_{rf\_params}$ such as RSCP measurement parameters of the sliding window are compared to a first threshold TH1.

If at least one signal measurement parameter $S_{rf\_params}$ such as RSCP measurement parameter of the sliding window is greater than threshold TH1, the collection of signal measurement parameters $S_{rf\_params}$ such as RSCP measurement parameters in step S520 will continue. On the contrary, if all signal measurement parameters $S_{rf\_params}$ such as RSCP measurement parameter of the sliding window are lower than threshold TH1 then the algorithm proceeds to step S550. In step S550, PLL frequency is changed from PLL_f1 to PLL_f2.

In step S560, the sliding window is reset such that it contains no signal measurement parameters $S_{rf\_params}$ such as RSCP measurement parameters. The sliding window, after being reset is further used in step S570 to collect signal measurement parameters $S_{rf\_params}$ such as RSCP measurement parameters. In step S580, a test is performed to verify whether at least N/3 of signal measurement parameters $S_{rf\_params}$ such as RSCP measurement parameters have been gathered in the sliding window where N is the number of signal measurement parameters $S_{rf\_params}$.

If it is not the case, the collection of signal measurement parameters $S_{rf\_params}$ such as RSCP measurement parameters in step S570 will continue. On the contrary, if at least N/3 of signal measurement parameters $S_{rf\_params}$ such as RSCP measurement parameters have been gathered in the sliding window during step S570 then the algorithm proceeds to step S580. In step S580, all signal measurement parameters $S_{rf\_params}$ such as RSCP measurement parameters of the sliding window are compared to a second threshold TH2.

If at least one signal measurement parameter $S_{rf\_params}$ such as RSCP measurement parameter of the sliding window is lower than threshold TH2 then the collection of signal measurement parameters $S_{rf\_params}$ such as RSCP measurement parameters in step S570 will continue. On the contrary, if all signal measurement parameters $S_{rf\_params}$ such as RSCP measurement parameter of the sliding window are greater than threshold TH2, the algorithm proceeds back to step S510 where PLL frequency is changed back from PLL_f2 to PLL_f1.

The proposed solution is applicable not only to PLL used in mixers, but also to ADC, For instance, and more generally to all type of PLL within a wireless device wherein spurs resulting from the operation of the PLL may affect the efficiency of the device.

While the proposed solution has been illustrated and described in details in the drawings and foregoing description, it is to be understood that such the above-described illustration and description are to be considered illustrative and exemplary only, the proposed solution being not restricted to the disclosed embodiments. Other variations to the disclosed embodiments can be understood and effected by those skilled in the art in practicing the claimed proposed solution, from a study of the drawings, the disclosure and the appended claims. It is therefore intended that such variations be included within the scope of the Claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the proposed solution.

The invention claimed is:

1. A method of controlling a PLL frequency selection of a PLL used in cooperation with a device of a wireless communication network, the method comprising:
   receiving a first set of signal measurements performed during a sliding window, while the PLL frequency has a first value;
   comparing the first set of signal measurements with a first threshold and, selectively switching the PLL frequency from the first value to a second value depending on a result of the comparing of the first set of signal measurements with the first threshold;
   receiving a second set of signal measurements during another sliding window after the PLL frequency has changed from the first value to the second value; and
   comparing the second set of signal measurements with a second threshold, different from the first threshold, and selectively switching the PLL frequency from the second value to the first value depending on a result of the comparing of the second set of signal measurements with the second threshold,
   wherein the first and second sets of signal measurements are related to a received signal power and the PLL frequency is changed from the second value to the first value when at least one third of signal measurements of the second set of signal measurements are beyond the second threshold.

2. The method according to claim 1, wherein a width of the sliding window is fixed to correspond to a number N of non-contiguous signal measurements, where N is an integer greater than 1.

3. The method according to claim 1, wherein the PLL frequency is changed from the first value to the second value when all signal measurements of the first set of signal measurements are beyond the first threshold.

4. The method according to claim 1, wherein the second value of the PLL frequency is chosen from a list of given PLL frequencies.

5. The method according to claim 1, wherein the first threshold is less stringent than the second threshold, making less difficult to switch from the second value to the first value than to switch from the first value to the second value.

6. A receiver comprising a mechanism for controlling a PLL frequency selection of a PLL used in cooperation with a device of a wireless communication network, the mechanism comprising:
   a unit configured for receiving a first set of signal measurements performed during a sliding window, while the PLL frequency has a first value;
   a unit configured for comparing the first set of signal measurements with a first threshold and, selectively switching the PLL frequency from the first value to a second value depending on a result of the comparing of the first set of signal measurements with the first threshold;
   a unit configured for receiving a second set of signal measurements performed while the PLL frequency has the second value during the sliding window after the PLL frequency has changed from the first value to the second value; and
   a unit configured for comparing the second set of signal measurements with a second threshold, different from the first threshold, and selectively switching the PLL frequency from the second value to the first value depending on a result of the comparing of the second set of signal measurements with the second threshold,
   wherein the first and second sets of signal measurements are related to a received signal power and the PLL frequency is changed from the second value to the first value when at least one third of signal measurements of the second set of signal measurements are beyond the second threshold.

7. The receiver according to claim 6, wherein a width of the sliding window is fixed to correspond to a number N of non-contiguous signal measurements, where N is an integer greater than 1.

8. The receiver according to claim 6, wherein the PLL frequency is changed from the first value to the second value when all signal measurements of the first set of signal measurements are beyond the first threshold.

9. The receiver according to claim 6, wherein the second value of the PLL frequency is chosen from a list of given PLL frequencies.

10. The receiver according to claim 6, wherein the first threshold is less stringent than the second threshold, making less difficult to switch from the second value to the first value than to switch from the first value to the second value.

11. The method according to claim 1, wherein each of the first and second sets of signal measurements related to the received signal power include at least one of signal quality measurements comprising chip energy to total power (Ec/Io) ratio measurements and signal strength measurements comprising received signal code power (RSCP) measurements.

12. The receiver according to claim 6, wherein each of the first and second sets of signal measurements related to the received signal power include at least one of signal quality measurements comprising chip energy to total power ratio measurements and signal strength measurements comprising received signal code power measurements.

13. The method according to claim 1,
wherein the first and second sets of signal measurements are signal quality measurements, and/or signal strength measurements; and,
wherein each of the first and second thresholds are signal quality thresholds, and/or signal strength thresholds, respectively.

14. The receiver according to claim 6,
wherein the first and second sets of signal measurements are signal quality measurements and/or signal strength measurements, and
wherein the first and second thresholds are signal quality thresholds and/or signal strength thresholds, respectively.

15. A wireless device operative with a mobile telecommunications network, the wireless device comprising:
a receiver including a control unit coupled to a radio frequency (RF) unit and a phase locked loop (PLL) block, the RF unit comprising a filter, a low noise amplifier and an RF signal processor, the RF unit coupled to a signal mixer associated with the PLL block, wherein the receiver is configured to perform a PLL frequency selection process comprising the acts:
setting a PLL frequency to a first value;
receiving a first set of signal measurements performed during a sliding window, while the PLL frequency has the first value;
comparing the first set of signal measurements with a first threshold and selectively switching the PLL frequency from the first value to a second value depending on a result of the comparing of the first set of signal measurements with the first threshold;
receiving a second set of signal measurements during another sliding window after the PLL frequency has changed from the first value to the second value; and
comparing the second set of signal measurements with a second threshold, different from the first threshold, and selectively switching the PLL frequency from the second value to the first value depending on a result of the comparing of the second set of signal measurements with the second threshold,
wherein the first and second sets of signal measurements are related to a received signal power and the PLL frequency is changed from the second value to the first value when at least one third of signal measurements of the second set of signal measurements are beyond the second threshold.

16. The wireless device according to claim 15, wherein the wireless device comprises a device selected from a group including a smartphone, a tablet and a computer operative with the mobile telecommunications network.

* * * * *